(12) United States Patent
Sinclair et al.

(10) Patent No.: US 7,640,324 B2
(45) Date of Patent: Dec. 29, 2009

(54) SMALL-SCALE SECURED COMPUTER NETWORK GROUP WITHOUT CENTRALIZED MANAGEMENT

(75) Inventors: Andrew P. Sinclair, Redmond, WA (US); John E. Brezak, Jr., Woodinville, WA (US); Eric Flo, Sammamish, WA (US); Chris Guzak, Kirkland, WA (US); Sean O. Lyndersay, Seattle, WA (US); Sterling Reasor, Bellevue, WA (US); Richard B. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 10/414,354

(22) Filed: Apr. 15, 2003

(65) Prior Publication Data

US 2004/0210767 A1 Oct. 21, 2004

(51) Int. Cl.
G06F 15/16 (2006.01)
G06F 15/173 (2006.01)
G06F 15/177 (2006.01)
(52) U.S. Cl. .................. 709/220; 709/243; 380/273
(58) Field of Classification Search ......... 709/200–203, 709/217–231, 243; 380/273
See application file for complete search history.

(56) References Cited

U.S. PATENT DOCUMENTS

| 4,780,821 A | 10/1988 | Crossley |
| 4,887,204 A | 12/1989 | Johnson et al. |
| 5,276,879 A | 1/1994 | Barry et al. |
| 5,603,019 A | 2/1997 | Kish |
| 5,649,105 A | 7/1997 | Aldred et al. |
| 5,684,984 A | 11/1997 | Jones et al. |
| 5,708,812 A | 1/1998 | Van Dyke et al. |
| 5,729,682 A | 3/1998 | Marquis et al. |
| 5,844,553 A | 12/1998 | Hao et al. |
| 5,968,121 A | 10/1999 | Logan et al. |
| 6,049,809 A | 4/2000 | Raman et al. |
| 6,085,199 A | 7/2000 | Rose |
| 6,119,116 A | 9/2000 | Rose |
| 6,161,104 A | 12/2000 | Stakutis et al. |

(Continued)

OTHER PUBLICATIONS

U.S. Appl. No. 11/111,895, filed Apr. 22, 2005.

(Continued)

*Primary Examiner*—Haresh N Patel
(74) *Attorney, Agent, or Firm*—Wolf, Greenfield & Sacks, P.C.

(57) ABSTRACT

Computers on a local computer network, such as a home network or a small business network, are formed into a secured network group that provides common user access control and enables resource sharing among the computers in the group. A computer on the local network discovers whether there are secured network groups existing on the local network. If one secured network group is found, the computer indicates to a second computer in the group its desire to join the group, and establishes trust with that computer, such as by entering a proper user name and password, or a secret identification number. Once the trust is established, the first computer joins the group. Within the secured network group, user accounts and user profiles are replicated to each of the computers in the group. The establishment of trust and the replication of user accounts and profiles among the computers in the group enable the implementation of security policies and user access control in a group-wide manner.

16 Claims, 5 Drawing Sheets

U.S. PATENT DOCUMENTS

| | | | |
|---|---|---|---|
| 6,295,541 | B1 | 9/2001 | Bodnar et al. |
| 6,324,571 | B1 | 11/2001 | Hacherl |
| 6,381,627 | B1 | 4/2002 | Kwan et al. |
| 6,453,029 | B1 * | 9/2002 | Campbell ................ 379/114.2 |
| 6,505,214 | B1 | 1/2003 | Sherman et al. |
| 6,549,916 | B1 | 4/2003 | Sedlar |
| 6,643,670 | B2 | 11/2003 | Parham et al. |
| 6,654,771 | B1 | 11/2003 | Parham et al. |
| 6,751,634 | B1 | 6/2004 | Judd |
| 6,879,564 | B2 | 4/2005 | Parham et al. |
| 7,082,200 | B2 * | 7/2006 | Aboba et al. ................ 380/273 |
| 7,290,132 | B2 * | 10/2007 | Aboba et al. ................ 713/153 |
| 2002/0019857 | A1 | 2/2002 | Harjanto |
| 2002/0095497 | A1 | 7/2002 | Satagopan et al. |
| 2002/0099728 | A1 | 7/2002 | Lees et al. |
| 2002/0194171 | A1 | 12/2002 | Judd et al. |
| 2003/0101253 | A1 * | 5/2003 | Saito et al. ................ 709/223 |
| 2003/0130984 | A1 | 7/2003 | Quinlan et al. |
| 2003/0149781 | A1 * | 8/2003 | Yared et al. ................ 709/229 |
| 2003/0204734 | A1 * | 10/2003 | Wheeler ................ 713/184 |
| 2004/0003086 | A1 | 1/2004 | Parham et al. |
| 2004/0059705 | A1 | 3/2004 | Wittke et al. |
| 2004/0172423 | A1 | 9/2004 | Kaasten |
| 2004/0215649 | A1 * | 10/2004 | Whalen et al. ................ 707/102 |
| 2005/0086300 | A1 | 4/2005 | Yeager et al. |
| 2005/0086478 | A1 * | 4/2005 | Peinado et al. ................ 713/171 |
| 2005/0216582 | A1 * | 9/2005 | Toomey et al. ................ 709/224 |
| 2007/0016630 | A1 * | 1/2007 | Samji et al. ................ 707/204 |

OTHER PUBLICATIONS

U.S. Appl. No. 11/111,733, filed Apr. 22, 2005.

* cited by examiner

SMALL-SCALE SECURED COMPUTER NETWORK GROUP WITHOUT CENTRALIZED MANAGEMENT

TECHNICAL FIELD

This invention relates generally to computer networks, and more particularly to a network platform for organizing a small number of computers to form a secured network group that does not depend on a dedicated device, such as a network domain controller, for providing centralized management.

BACKGROUND OF THE INVENTION

With the advancements in computer network technologies, large computer networks have become quite complicated, with sophisticated administration schemes for managing user access and security of the network. For instance, a large computer network typically has multiple domains, each having a primary domain controller that contains a database of usernames, passwords and permissions for machines in its domain.

In contrast, small-scale local networks, such as home networks and small business networks, have remained rather simple and unsophisticated. Most of the small-scale networks are unmanaged in that there are no dedicated devices, such as domain controllers in a large network, for handling account information in a centralized manner. The machines in such an unmanaged network typically are connected to the same hub and operate as a loose peer-to-peer group (sometimes called a "workgroup") intended only to help users find such things as printers and shared folders within the workgroup. Otherwise the machines operate like stand-alone machines. As a result, the unmanaged network offers little value to the users. There is no effective security administration, and the machines are not well integrated to facilitate network access and resource sharing. Local accounts must be manually created on every machine, and there is no relationship between accounts on different machines in the workgroup. Thus, a user may be able to log onto one machine but not another machine in the same network because her account has not been set up on the latter. There is no reliable mechanism to enumerate the computers in the network. Also, the sharing of resources on the machines can be difficult to implement and difficult to manage to provide security.

SUMMARY OF THE INVENTION

In view of the foregoing, the present invention provides a platform and method for organizing a small number of computers on a local computer network to form a secured network group that provides common user access and secure resource sharing among the computers in the group. In accordance with the invention, a first computer that wants to joins a secured network group first discovers whether there are existing secured network groups on the local network. If a secured network group is found, the first computer indicates to a second computer in the group its desire to join the group, and establishes trust with the second computer, such as by entering proper user name and password, or a secret personal identification number. Once the trust is established, the first computer joins the group. Within the secured network group, user accounts and user profiles are replicated to each of the computers in the group.

The establishment of trust and the replication of user accounts and profiles among the computers in the group enable the implementation of security policies and user access control in a group-wide manner. It is secured from the outside world while allowing authorized users to access the computers and share resources. Each user has an identity known to all computers in the secured group. This allows a user that has a valid account to log into any of the computers in the secured network group with the same user name and password. The user can access her documents and her own settings, even when the documents are on different computers. The sharing of resources, such as files, of a given user with other users of the secured network group can be controlled based on the other users' identities. With the establishment of the secured computer network group, a local computer network such as a home network or a small business network becomes much more useful and can support many user scenarios, without the need for a dedicated central management component such as a domain controller typically used in much larger computer networks.

DETAILED DESCRIPTION OF THE INVENTION

Figure 1:
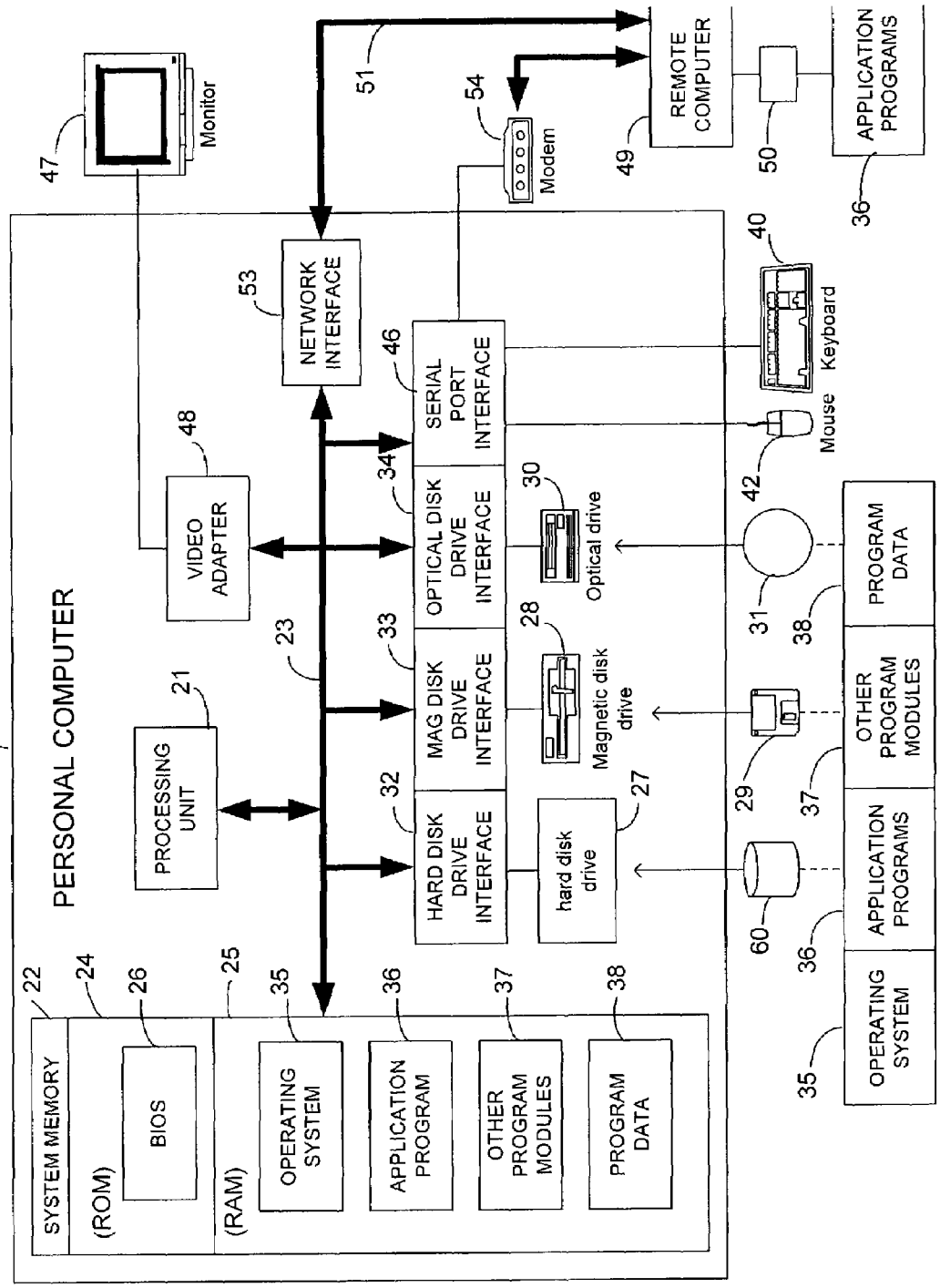
FIG. 1 is a block diagram generally illustrating an exemplary computer system that may be used in a small-scale secured network group in accordance with the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in a small-scale secured network group in accordance with the invention, and the invention will be described in greater detail with reference to FIGS. 2-5. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
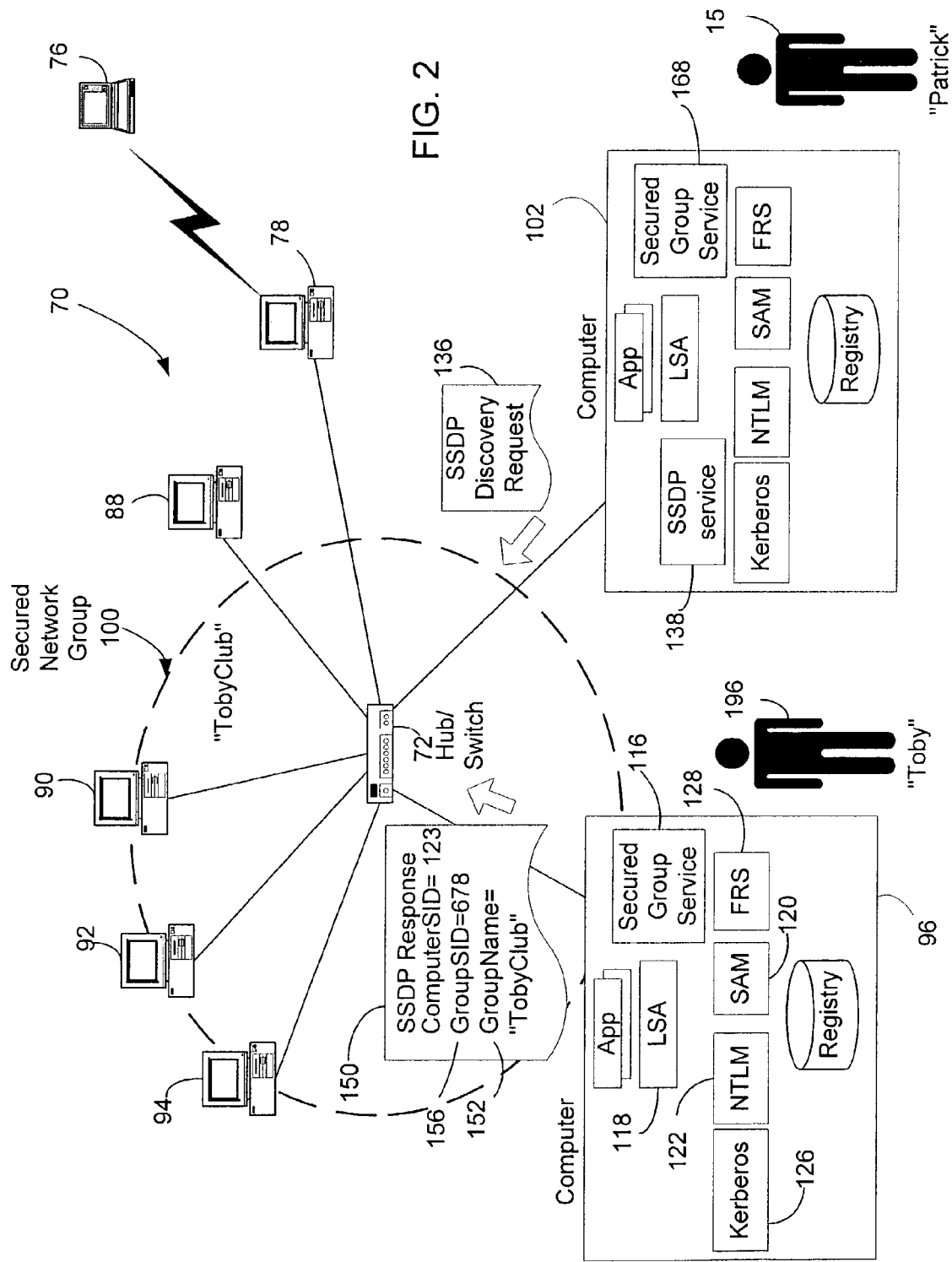
FIG. 2 is a schematic diagram showing a local computer network on which a small number of computers are formed into a secured network group in accordance with the invention.

Referring now to FIG. 2, the present invention is directed to a platform for a small number of computers, such as ten (10) or less, on an unmanaged local network to form a secured network group to provides group-wide control over user access and resource sharing, but doing so without the need to use a centralized management component. In the context of the present invention, "secured network group" means that security policies and access controls are implemented group-wide to prevent unauthorized access and use of resources by computers or users not in the group, while allowing the sharing of resources within the group on a per-user basis. In this regard, the secured network group may be conceptually viewed as a "castle" that resides in the local network, wherein computers in the "castle" work together to protect themselves from possible intrusions by users and machines on the outside, while users in the "castle" are given a high degree of freedom and cooperation in accessing the machines and resources of the group.

For illustration purposes, FIG. 2 shows an embodiment of a small local network 70, which is typical of home networks and small business networks. The local network is "unmanaged" in the sense that it does not have a centralized management component, such as a domain controller or the like. As shown in FIG. 2, the local network has a network hub or switch 72, and a plurality of computers (or computing devices) connected thereto. The connections between the computers may be wireless. For example, the device 76 is a wireless device that communicates with the network through an access point 78.

In accordance with the invention, some of the computers on the local network 70 may form a secured network group. It will be appreciated that the secured network group of the invention does not depend on the particular topology of the network. For instance, a secured network group may be established in an ad hoc network formed by wireless devices. Due to the management concerns and the need to replicate data, the secured network group platform works more effectively when the number of computers in the group is kept small. In a preferred embodiment, the number of computers that can join a given secured network group is limited to 10 or less.

By way of example, as illustrated in FIG. 2, the computers 90, 92, 94, and 96 have formed a secured network group 100 (indicated schematically by the dashed lines connecting the computers) that has a user-friendly name "TobyClub". A new secured network group can be created, if there is no existing group to join or if the user of a computer does not want to join any existing group. In this regard, in a preferred embodiment, each computer can belong to only one secured network group. As will be described in greater detail below, the computers in the secured network group have established trust among themselves, and share information such as user account data and user profile data within the group. A new computer, such as the computer 102, can join the secured network group 100, and computers in the group can leave the secured group and, in special cases, be evicted from the group.

Figure 3:
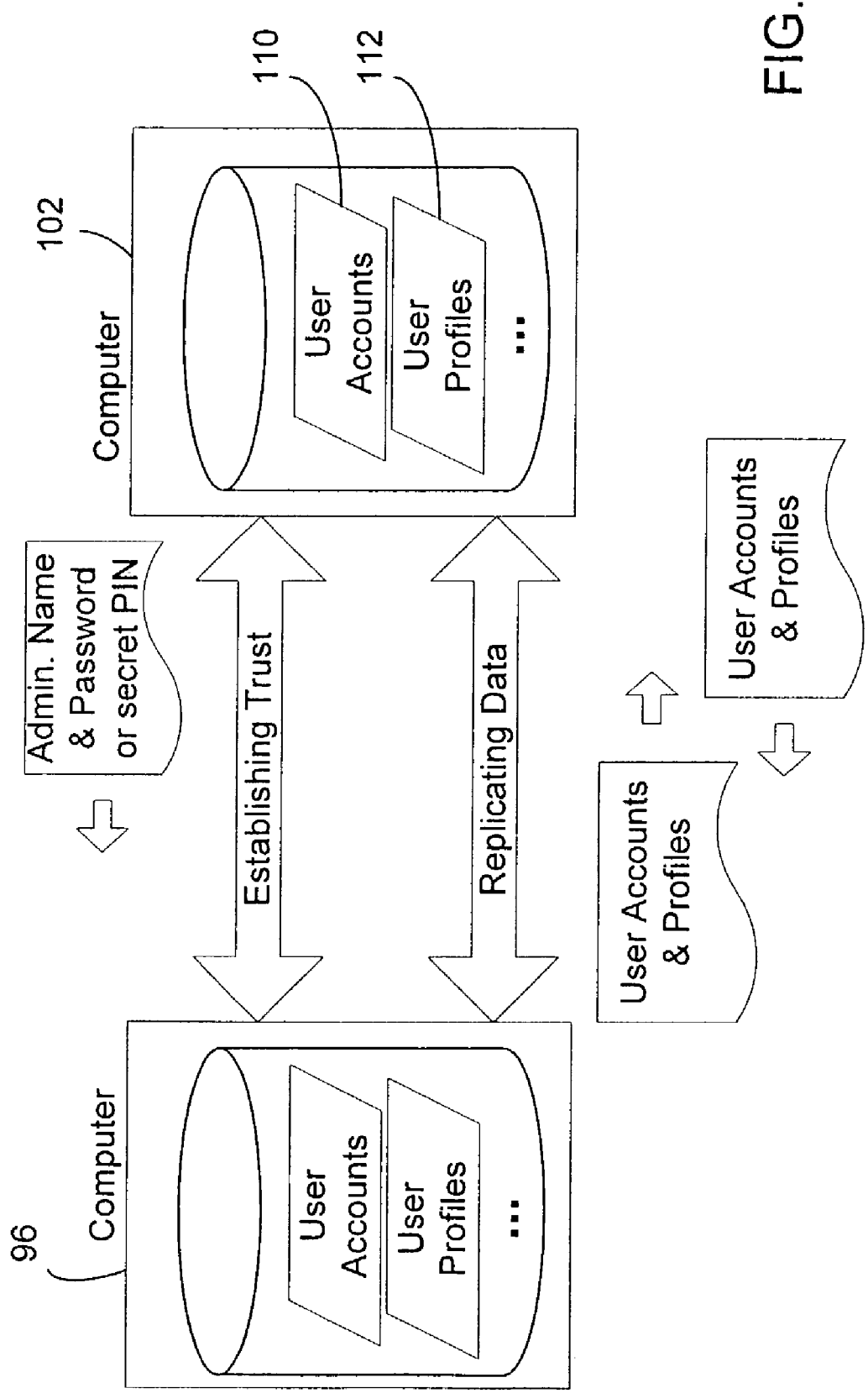
FIG. 3 is schematic diagram illustrating the establishment of trust and replication of user accounts and user profiles between two computers in a secured network group.

The concept underlying the formation of a small-scale secured network group on an unmanaged local network is illustrated in FIG. 3. For a computer 102 to join another computer 96 to form a secured network group, the computer 102 has to first establish trust with the second computer 96. This happens either when the computer 102 wants to join an existing secured group to which the computer 96 belongs, or when the computer 102 responds to an invitation of the computer 96 to form a new group. There are many different ways to establish trust between the two computers. Typically, it requires one computer to authenticate itself to the other by showing that it knows some secret known to the other. In a preferred embodiment, the secret is the user name and password of a group administrator accepted by the other computer. In an alternative embodiment, the secret is a random personal identification number (PIN) generated by the other computer. In some implementations, mutual authentication between the two computers may be required. It will be appreciated that the particular way to establish trust between the two computers is not critical to the invention.

After the trust between the computers 96 and 102 has been established, the computers form a secured network group or, if the computer 96 belongs to an existing secured network group, the computer 102 is accepted into that group. To that end, in a preferred embodiment, each secured network group has a SID that is randomly generated when the group is created, and each node in the secured group gets a unique relative identifier (RID) allocation pool that is allocated to that node when it joins the group. When a computer becomes a member of a secured network group (either by creating a new group or joining an existing group), the machine's SID and SIDs of user accounts on that machine are changed or recreated to the group's SID to reflect the network group's authority/identities. It should be noted that changing a SID affects all entities that are dependent on the SID. For instance, access to the files/folders of a user will be affected when the SID of the user is changed. In one implementation, to avoid any disruption caused by the SID change, the computer maintains a local SID mapping/history database that stores the old SIDs. This mapping/history database maps the old SIDs to the new SIDs, and can be used to restore access to the files and folders.

After the formation of a secured network group, user account data and user profiles are replicated to each computer in the group. As illustrated in FIG. 3, the user account data 110 on the computer 96 are replicated to the computer 102, and vise versa. After the user accounts are replicated, user profiles 112 associated with the user accounts are replicated to the other computers. The term "user profile" is used herein to mean a selection of data pertaining to a specific user. For instance, the user profile may include registry settings for that user, selected documents of the user, and security policies, the user tile (i.e., an iconic representation of the user), and settings, configurations and files for personalizing user sessions, etc. The particular contents of the user profile depend on the implementation. An administrator of the secured group can create user accounts and set security policies on one computer in the group, and the accounts and security policies are replicated to all the machines in the secured group. Since each computer in the group has all the user accounts and user profiles, a user that has a valid account can log on to any computer in the group using her user name and password. Replicating data such as user tiles and settings, configurations and files for personalized user sessions also allow the user to have a uniform user experience across the computers in the secured network group.

Returning to FIG. 2, in a preferred embodiment, a computer 96 capable of participating in a secured network group is provided with a secured group service 116 for handling the creation, joining, and operations of secured network groups. The computer 96 also has a local security authority (LSA) 118, and a security account manager (SAM) 120. The local security authority 118 is a user mode process that is responsible for the local system security policies, user authentication, and sending security messages to an event log of the operating system. The security policies specify, for example, which users are allowed to log onto the machine, password policies, privileges granted to users and groups, and system security auditing settings, etc. The security account manager 120 manages a database stored in the system registry of the computer that contains data identifying users and groups allowed to access the machine, along with their passwords and other attributes. The computer further includes one or more authentication modules, such as the NT LAN Manager (NTLM) module 122 or Kerberos module 126, for performing authentication operations according to a selected authentication protocol. Furthermore, a File Replication Server (FRS) 128 is used for replicating data and files, including user accounts and profiles, to other computers in the secured network group.

Figure 4:
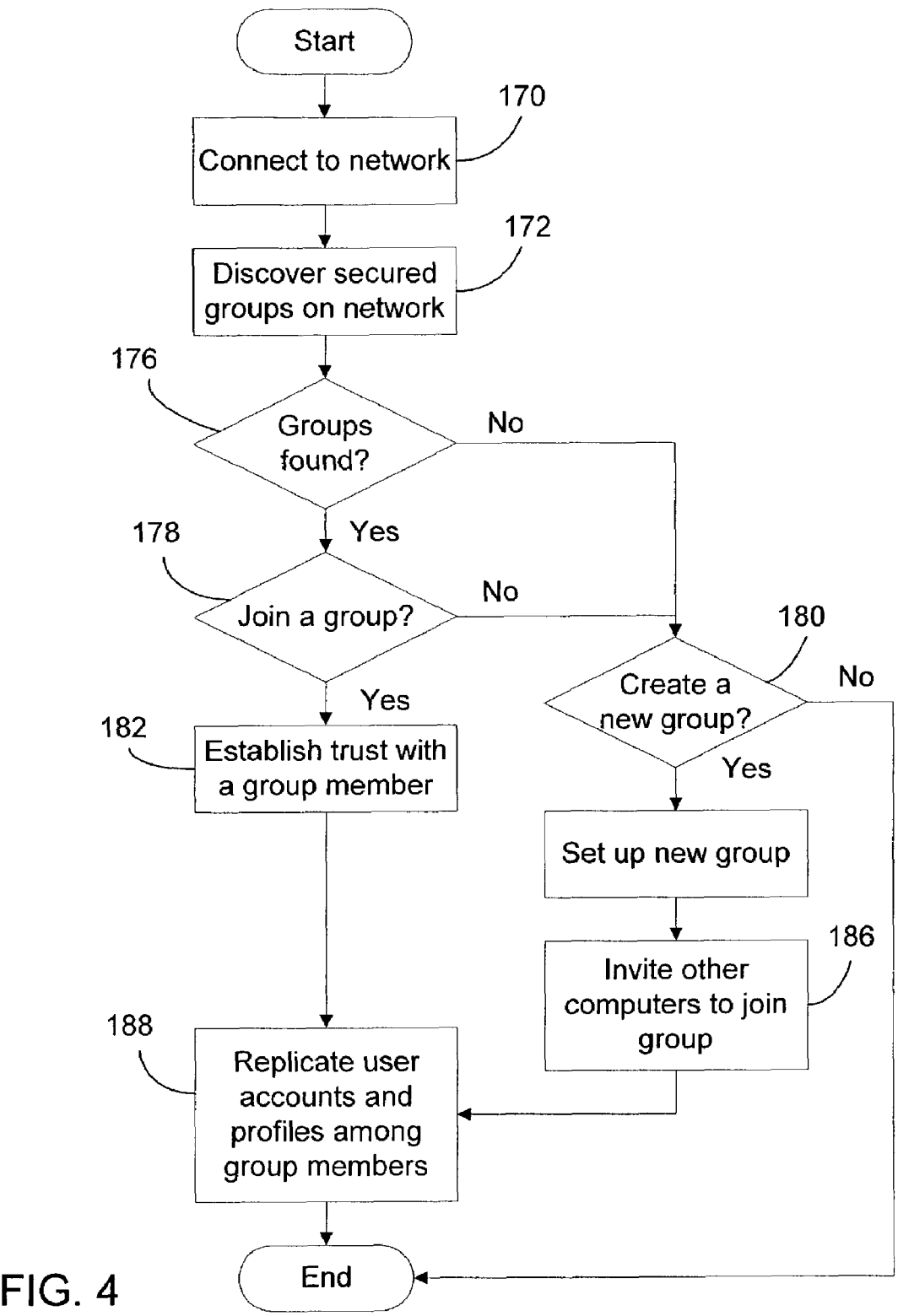
FIG. 4 is a flowchart showing a process for a computer to join a secured network group.

Referring now to both FIGS. 2 and 4, in a preferred embodiment, when a standalone computer 102 is connected to the local network 70 and turned on (step 170), its operating system automatically discovers whether there are secured network groups existing on the local network (step 172). To that end, the computer 102 broadcasts a discovery request 136 according to the Simple Service Discovery Protocol (SSDP) to detect the other machines connected to the local network. In this regard, the secured group service 116 on a computer 96 that belongs to a secured group has already registered the friendly name and SID of the secured group with a SSDP service 138 of the computer. In response to the SSDP request, each computer on the local network 70 returns a response. The response identifies the responding computer and whether it is part of a secured network group and, if so, information regarding that group. For instance, the response 150 from the computer 96 includes a group name 152 indicating that it is a member of the secured network group called "TobyClub," and a security identifier (SID) 156 of that group. In general, a SID is a means of uniquely identifying entities that perform actions in a system and typically is a variable length numeric value.

Figure 5:
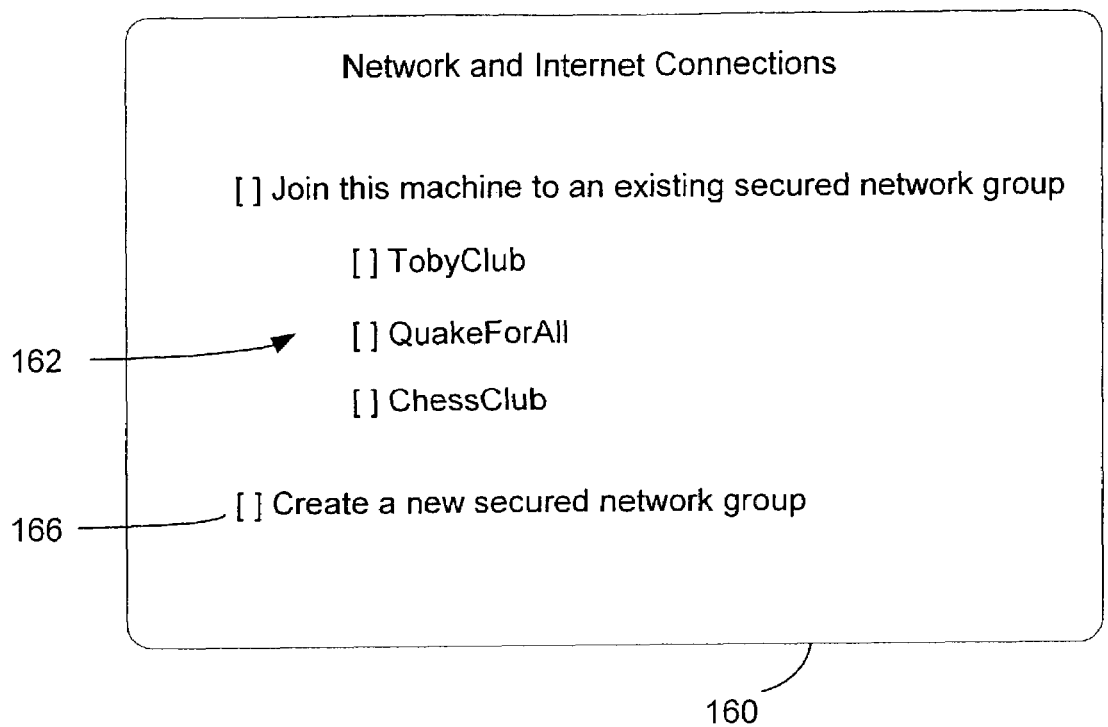
FIG. 5 is a diagram showing an exemplary user interface window that provides options to join or create a secured network group.

If the computer 102 detects one or more existing secured network group on the local network (step 176), when its user 158 ("Patrick" in FIG. 2) logs in, a user interface window pops up, asking whether the user wants the computer to join any of the existing secured network group (step 178). An example of the user interface window is shown in FIG. 5. The user interface window 160 provides a list 162 of existing secured network groups on the local network the computer has detected, and the user can select one to join by clicking on the name of the group. If no existing secured network group on the local network has been detected, the list will be empty. The user interface also includes a query 166 to give the user the option of creating a new secured network group. Thus, in the absence of an existing secured network group, the user can select to create a new one (step 180). Even if there are secured network groups existing on the local network, the user can still choose to create a new one instead of joining any existing group. For example, if the computer 102 detects that the computer 88 on the local network is not a member of any secured group (i.e., the computer 88 is a "standalone" machine), the user 158 may decide to create a new secured group and invite the computer 88 to join the group (step 186).

If the user 158 ("Patrick") selects the option of creating a new secured network group (step 180), the secured group service creates a new random SID for the new group, and changes the computer's account domain SID to the new SID of the group. The secured group service then creates a "Secured Group Nodes" group, which is a security local group that contains computer accounts representing the computers in that secured network group. Only computers listed in the Secured Group Nodes group can perform replication with other computers in the group. An account is created for the computer with a randomly generated password, and the account and password are added to the Secured Group Nodes group. The corresponding LSA secret for this account for authentication in replication operations is set with the password. A RID base is allocated for the computer.

The secured group service 168 also creates a "Secured Group Administrators" group for holding credentials of the administrator(s) of the new secured network group. Only an administrator identified in the Secured Group Administrators group is allowed to add or remove nodes in the secured group. A "Secured Group Admin" account is created, and the user 158 is prompted to enter a good (non-blank) password. After the user enters a password, the Secured Group Admin account is added to the Secured Group Administrators group. A secured group service 168 is then launched via the Service Control Manager (SCM) of the operating system as a background task for handling operations related to the secured network group (step 188).

If, on the other hand, the user 158 chooses to join an existing secured network group detected by the computer 102 (step 178), one of the nodes in that group that have responded to the SSDP request is chosen, and a connection is established to the remote procedure call (RPC) interface of the secured group service of that selected node. In the example illustrated in FIG. 2, the computer 102 has chosen to talk to the computer 96. The computer 96 then issues a request for the computer 102 to authenticate itself. By properly authenticating itself, the computer 102 establishes trust with the computer 96 (step 182). In doing so, the computer 102 also establishes trust with the remaining nodes of that group 100 since they trust the computer 96 and are supposed to trust any computer trusted by the computer 96. In an alternative embodiment, however, a computer that wants to join a secured network group may be required to establish trust individually with each of the computers in the group.

As described above, a common way to establish trust is for the computer to present a secret known to the other computer. In a preferred embodiment, the secret is the name and password of a group administrator that is registered in the Secured Group Administrators group of the target node. In response to the challenge from the target node, the computer 102 prompts the user 158 to enter a valid administrator name and password. In one implementation, the administrator 196 (illustrated in FIG. 2 as "Toby") may simply walk over to the computer 102 that wants to join the secured network group and enters his user name and password. The computer 102 transmits the entered administrator name and password to the target node 96. The target node 96 checks the administrator name and password returned by the computer. If they are valid (i.e., they are found in the Secured Group Administrators group), trust has been established, and the computer 102 becomes a member of the secured network group 100 The target node 96 creates a computer account for the joining computer and passes back the computer's secret to the administrator on the joining computer along with information about the secured network group (such as its name and SID) and its assigned RID base for creating new accounts. The joining computer then saves the computer secret and starts the process of changing the SID and RIDs to prepare the computer for operations in the secured network group. At this point, the joining computer will initiate a "sync" operation with the join partner computer (i.e., the target node), which is the only computer in the group that the joining computer trusts at this point and is therefore used in the initial replication.

Thereafter, user accounts and user profiles are replicated from time to time among the members of the secured network group (step 188). In one implementation, a computer that is a member of a secured network group periodically (e.g., every 4 minutes) sends a "Hello" message to all other nodes in the group. The Hello message contains the group SID, the node's current system time, the base RID it uses for new accounts/groups, and the last update count of the replication. The other group members are not required to respond, but will update their table of group members accordingly and record the last time that a "Hello" was received from that member. When a SAM change is received from the LSA, the secured group service on the computer sends a "Notify" message to all nodes in the secured group. When a group node receives the Notify message, it compares the UpdateCount in the message to its current UpdateCount. If this change is newer than the current UpdateCount, the change is made to the local SAM of the receiving node. Once committed, the UpdateCount in the node's hello record for the reporting node is updated with the information from the Notify message, and the UpdateCount is set to the new value. The secured group service may also send a Sync message to one or all other nodes in the group to catch up with those nodes when it determines that it is out of sync with them. This may happen when the node reestablishes connectivity with the group after an absence (e.g., power down, etc.) or when an update sequence number difference is detected through the Hello messages.

In an alternative embodiment, instead of using the administrator name and password as a secret, the target node 96 generates a random personal identification number (PIN) as the secret. The user 196 ("Toby") of the target node gives the secret PIN to the user 158 ("Patrick") of the computer that wants to join the group. The user 158 then enters the PIN into the computer 102 in response to the prompt, and the PIN is delivered to the target node 96 via the network connection.

It will be appreciated that communications during the phase of establishing trust and the subsequent communications among the group members for duplicating user accounts, user profiles, and other data in connection with the operations of the group should all be properly protected by digital signatures and encryption to protect the integrity and confidentiality of the data. To that end, the communications should follow a suitable authentication protocol, such as the NTLM or Kerberos. In one implementation, the nodes of the secured network group replicate using (DCE) RPC employing the NTLM authentication mechanism. The channel is protected with call-level authentication and privacy, and access control is based on server-based checks for the caller being a member of the secured network group. The use of authentication measures prevents other computers on the local network from eavesdropping and tampering with the communications between the nodes in the secured network group.

After joining a secured network group 100, a computer 102 can voluntarily leave the group. To do so, the user 158 logs onto the machine 102 to be removed from the secured network group and through an appropriate user interface window chooses to leave the group. In one implementation, when a computer leaves the secured network group, the computer is removed from the Secured Group Nodes group, and its corresponding computer account is deleted. This breaks the trust used to replicate the accounts. On the computer leaving the group, the Secured Group Administrators and Secured Group Nodes groups are deleted along with all computer accounts. The computer SID, however, is left to be the same as it had while joined to the group. After being removed from the group, the computer 102 becomes a standalone computer on the local network. It is no longer trusted and will not receive any further updates of user accounts and profiles.

In some special situations, a computer may be "evicted" from a secured network group. For instance, if a computer in the group has been stolen, it may be necessary to evict that computer from the group so that someone cannot later use it to access the data and resources of the group. The evicted computer is removed from the Secured Group Nodes group and its account in the group is deleted. This stops replication of account information to the evicted computer in the future. Nevertheless, other measures should be used to completely cut the evicted computer off from the group. Since the evicted computer has a full copy of the account database (including passwords), it can try to authenticate itself as any other user (or computer) and still gain access to the secured group. Because of this, some measure has to be taken so that the residual secrets can be changed without the evicted computer being able to eavesdrop on the communications and see the passwords. As part of the eviction process, the computer's secrets may have to be changed off line before any user secrets are changed. The changing of the computer's secret may be done "out-of-band" on a private channel, such as using a floppy disk to carry the secret. In one implementation, after evicting a computer, the administrator 196 of the secured network group has to recreate the group without the computer being evicted. As part of the recovery process, one computer ("the recovery computer") remaining in the group is isolated (i.e., removed from the network) and used to stage the group recovery. A new random LSA secret is generated for each computer remaining in the group and stored as the new computer password for the computer in the recovery computer's local account database. The new secrets, however, cannot be transmitted over the network to the other computers due to the risk that the machine to be evicted may receive the updates. To deal with this problem, the administrator 196 creates an "eviction" floppy disk (or any other portable medium, such as CD ROM) for each remaining computer in the secured group that contains the new LSA secret for that computer. The administrator logs on to each computer he wants to keep in the secured network group with his administrator account and runs the eviction disk on the computer to change the password of that computer. Once the eviction disk is run on the machines remaining in the group, all users are required to change their passwords when they log onto computers in the group, because the evicted computer has all of the users' existing passwords (or at least the derived keys).

One advantage of the secured network group according to the invention is that each user has an identity known to all computers in the group. As a result, a user can log onto any of the computers in the secured group with the same user name and password. For instance, in a small business setting, an employee can log into any of the computers on the local office network that form a secured group with the same user name and password, without the need to set up a user account separately on each of the computers. Also, when the user changes his password on one of the computers in the group, the change will be replicated to the other computers. Thus, a secured network group significantly simplifies the creation and modification of user accounts, and makes the computers in the group much more "accessible" to authorized users.

The improved network integration of the computers in a secured network group also allows user to enjoy the benefits of computer networking. After logging into any of the computers in the group, a user can access all of her documents using her own settings, regardless of where the documents and settings are actually stored. This is again made possible because all the documents of the user are associated with a single user identity that is recognized by all the computers. Thus, a query can be made to identify all the documents and setting of the given user. This enables a user to have a "unified" view of all her documents and settings over the entire secured group.

As described above, the user profiles replicated among the computers in a secured group may include documents of the users. In one embodiment, a pre-selected set of documents of a given user, such as those in her "MyDocuments" folder, will be replicated to each computer in the secured group automatically. When the user has modified one of the documents, the document revision is detected, and the modified document is replicated to the other computers in the group by the file replication service (FRS). In one implementation, to save the amount of memory used by the computers for storing replicated documents, files that are too large are not replicated. Instead, if a file exceeds a threshold size, only a link to the file on the computer that stores the file will be replicated to the other computers.

The secured network group also enables secured sharing of files between users of the group. A user that wants to share her document with a second user can modify the properties of the document to indicate that the second user is allowed to access the document. When the second user uses an application to access the document, the document properties are checked to confirm that the second user has been given access to the document. In one implementation, a user of a secured group in a small business network can share a document only with one other user. In an alternative implementation, a user of a secured network group can share her files with all users of the group. This implementation is preferred used in a home network setting.

The secured network group may allow computers that have not joined the group to have limited access to the group. For instance, a user may bring her laptop back from work and connect it to her home network, but selects not to join the secured group on the home network. In such as case, the non-member computer may be given a guest status and be allowed to access a pre-selected set of resources. Similarly, an old computer (i.e., one without the software for operations relating to a secured network group) may still communicate with the computers in the secured network group in the same way it would in a conventional workgroup.

The secured network group in accordance with the invention has opened up the possibilities of numerous user scenarios. By way of example, one user scenario involves "roaming parental control" in a home network. A parent can create parental control restrictions that limit how a child can use the computers. The parental control restrictions are replicated to all the computers in the group. Thus, when the child logs onto any of the computers in the group, the parental control restrictions "follow" the child regardless of which computer the child is using. In addition, the audit report of the child is updated with all his activities on each computer in the group. It will be appreciated that the possible user scenarios are too many to be individually identified here. Nevertheless, those scenarios are all built upon the trust and user data replication within the secured network group in accordance with the invention and are thus within the scope and spirit of the invention.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable storage medium having computer-executable instructions that when executed by a first computer connected to a local computer network cause the first computer to perform steps of:
    discovering a secured computer network group within the local computer network, the secured network group not depending on a dedicated device for providing centralized management;
    responsive to said discovering, selecting a computer within the secured computer network group;
    establishing a communication between the first computer and the computer within the secured computer network group;
    establishing trust between the first computer and the computer within the secured computer network group to allow the first computer to join the secured computer network group;
    responsive to said establishing of trust, replicating user accounts to and from computers in the secured network group and the first computer, to enable the computers to access a user account originating from the first computer, wherein:
    the step of discovering includes broadcasting a discover request over the local computer network to computers connected to the local computer network; and
    the discovery request is constructed according to a Simple Service Discovery Protocol.

2. The computer-readable storage medium as in claim 1, wherein the step of replicating replicates user-specific data in addition to the user accounts.

3. The computer-readable storage medium as in claim 2, wherein the user-specific data includes user documents.

4. A computer-readable storage medium having computer-executable instructions that when executed by a first computer connected to a local computer network cause the first computer to perform steps of:
    discovering a secured computer network group within the local computer network, the secured network group not depending on a dedicated device for providing centralized management;
    responsive to said discovering, selecting a computer within the secured computer network;
    establishing a communication between the first computer and the computer within the secured computer network group;
    establishing trust between the first computer and the computer within the secured computer network group to allow the first computer to join the secured computer network group;
    responsive to said establishing of trust, replicating user accounts to and from computers in the secured network group and the first computer, to enable the computers to access a user account originating from the first computer,
    wherein:
    the user-specific data includes user documents; and
    the computer-readable storage medium further comprises computer-executable instructions for performing the steps of:
    detecting that one of the user documents is changed; and
    replicating the user documents that has changes to computers in the secured computer network group.

5. The computer-readable storage medium as in claim 1, having further computer-executable instructions for performing the steps of:
    receiving a changed password from a user; and replicating the changed password to other computers in the secured computer network group.

6. The computer-readable storage medium as in claim 1, having further computer-executable instructions for performing a step of:
    presenting a user interface after the step of discovering, the user interface including an option of joining a secured computer network group identified in the step of discovering.

7. The computer-readable storage medium as in claim 1, wherein the step of establishing trust includes presenting a secret known to the selected computer within the secured computer network group.

8. The computer-readable storage medium as in claim 7, wherein the secret is a user name and password.

9. The computer-readable storage medium as in claim 7, wherein the secret is a randomly generated secret personal identification number.

10. The computer-readable storage medium as in claim 1, having further computer-executable instructions for performing steps of:
    in response to a user input, creating a new secured computer network group within the local computer network;
    inviting a second computer within the local computer network to join the created secured computer network group;
    establishing trust with the second computer; and
    replicating user accounts to and from the second computer.

11. The computer-readable storage medium having computer-executable instructions for execution on a first computer as in claim 1, having further computer-executable instructions for performing the step of:
    receiving a user request to leave the secured computer network group; and
    leaving the secured computer network group.

12. A method for a first computer within a local computer network to interface with other computers within the local computer network, comprising:
    connecting the first computer to the local computer network;

discovering a secured computer network group within the local computer network;

responsive to said discovering selecting a computer within the secured computer network group;

establishing a connection between the first computer and the computer within the secured computer network group;

establishing trust between the first computer and the computer within the secured computer network group to allow the first computer to join the secured network group;

responsive to said establishing of trust, replicating user accounts to and from computers in the secured computer network group and the first computer, to enable the computers to access a user account originating from the first computer, wherein:

the user-specific data include user documents; and the method further comprises:

detecting changes to at least one of the user documents; and replicating the changes to computers in the secured computer network group.

13. The method as in claim 12, wherein the step of discovering includes broadcasting a discovery request over the local computer network to computers connected to the local computer network.

14. The method as in claim 12, wherein the step of replicating replicates user-specific data in addition to the user accounts.

15. The method as in claim 12, further including the steps of:

receiving from a user a changed password of the user; and replicating the changed password of the user to other computers in the secured computer network group.

16. The method as in claim 12, wherein the step of establishing trust includes presenting a secret known to the selected computer in the secured computer network group.

* * * * *